May 9, 1961   C. P. SPIER   2,983,005
SIPE BLADES
Filed Feb. 17, 1959

INVENTOR
CARL P. SPIER
BY
Curtis, Morris & Safford
ATTORNEYS

United States Patent Office 2,983,005
Patented May 9, 1961

2,983,005
SIPE BLADES

Carl P. Spier, Yellow Springs, Ohio, assignor to Morris Bean & Company, Yellow Springs, Ohio, a corporation of Ohio Filed Feb. 17, 1959, Ser. No. 793,724

5 Claims. (Cl. 22—160)

This invention relates to the Sipe blades used in the manufacture of automobile tires and other slit articles of elastomeric material.

An object of the invention is to facilitate the manufacture of plaster core forms for casting metal tire molds having Sipe blades incorporated into them during casting, e.g., as set forth in prior patents of Morris Bean & Company, Nos. 2,736,924; 2,765,508; 2,836,867 and 2,872,715, and the Bean and Gunsaulus Patent No. 2,263,001.

Many tire manufacturers nowadays take advantage of these inventions to provide in the treads of their tires numerous slits which give square edges to act as squeegees against road surfaces and thereby give the tires better traction, especially on slippery or wet roads. These slits, as first used by Mr. Sipe, were made by cutting the tread rubber, but now generally are formed in the tire during manufacture by very thin metal blades, called "Sipes," which project from the face of the tire molds. In some instances, these Sipes have been mechanically driven into the face of the plaster mold or pattern or model; in other instances, where very many of these Sipes have been used, closely spaced and arranged in intricate designs, it has been found better to fit them into pre-formed slits in the pattern or model used for making the tire mold.

One way of using Sipes is manually to drive, or force-fit, the blades into a rigid plaster mold, allowing the portions which are to be anchored in the metal tire mold casting, to protrude from the plaster. Then, when the metal is cast on this mold, the blades are anchored in the casting. This method has the disadvantage of being expensive and time consuming. Also, some blades, because of their size or shape, cannot be inserted without breaking the plaster at the mold surface.

Another way of getting blades into the metal tire mold is to set them into slots in a pattern, e.g., of a material such as Korogel (a vinyl chloride gel elastomer), and then pour a plaster slurry onto the pattern and around Sipes. This method is described and claimed in U.S. Patent No. 2,263,001. In this method it is necessary to form slots in the flexible patterns and fit the Sipes into the slots before pouring the plaster over the pattern; but this multitude of slots, which heretofore have been long and deep slits, seriously weaken the flexible pattern. In addition, such flexible materials as Korogel, are subject to distortion as they age, e.g., due to loss of plasticizer, such distortion tending to localize at corners, cuts, and slots because of the large exposed surface relative to the mass. The present invention minimizes this difficulty.

In one way of making a cast metal tire mold, for instance, a full size model is made of a portion of the tire which represents a repeat pattern of the tread to be reproduced by the mold. On this model, in turn, there is molded a resilient plastic material, e.g., Korogel, for use as a pattern for the casting mold. This resilient material is advantageously applied to the model in a liquid or syrupy state and is set to a tough rubbery material having an exact impression of the model. The resulting pattern, when set, is stripped from the model and advantageously is mounted on a rigid support as described and claimed in the Bean U.S. Patent No. 2,402,528. Thereafter a suitable mold material, such as plaster of Paris, is poured onto this "negative" pattern suitably combined with the usual cooperating mold parts and is allowed to harden into a casting mold which is a "positive" replica of the tire. This plaster cast is then used for casting molten metal such as aluminum to form a "negative" tire mold casting. A new plaster mold must be used for each tire mold thus cast, and so it is highly desirable from the standpoint of cost that the flexible pattern be re-usable many times.

In accordance with the present invention, the portions of the Sipe blades which project into the flexible pattern material are cut away in large part leaving projecting foot portions or feet to anchor them in the pattern and thereafter in the metal tire mold. These feet are inserted into corresponding short slots in the flexible pattern, so that the long, deep closely spaced slots previously required are no longer necessary. This as explained above increases the strength and service life of the flexible pattern. Advantageously a very shallow slit, e.g., 1/64" or 1/32" deep connects the deeper slits for the feet of each Sipe. These shallow slits merely cover the edges of the Sipes without substantially weakening the pattern.

A better understanding of the invention together with a fuller appreciation of its advantages will best be gained from the following description given in connection with the accompanying drawings wherein.

Figure 1:
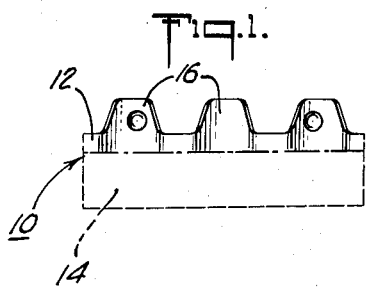
Figure 1 is a face view of a Sipe blade made according to the invention.

As seen in Figure 1, Sipe blade 10 has a root portion 12 shown in solid lines and a head portion 14 shown dotted. The depth of the root portion is somewhat exaggerated for clearer showing. The head portion may have whatever shape is desired by the user, i.e., the tire manufacturer, and is the portion which projects into the tread of a tire when it is made. It may be flat or it may be curved (i.e., non-planar) as shown. The root portion 12 of blade 10 on the other hand will be embedded and held in a cast metal tire mold and this root portion is shaped according to the invention by cutting it away in spaced areas to leave the projecting feet 16. The cut-away regions between these feet, as was explained, decrease the extent and depth of slits in the flexible tire pattern needed to hold the blades, and they likewise reduce the interruption of the plaster continuity by the blades.

Figure 2:
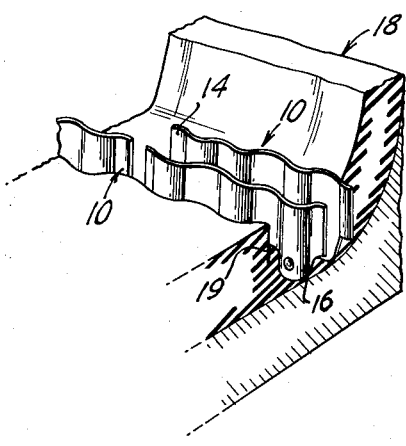
Figure 2 is a perspective view of several of the Sipe blades inserted feet down in a negative pattern; and, Figure 3 is a perspective view of a section of a "positive" plaster mold having embedded in it an array of Sipe blades according to the invention.

Figure 2 shows a portion of such a pattern 18 for a tire mold with Sipes 10 arranged in accordance with a tread design and illustrates how the feet 16 of the Sipe blades 10 project into slits 19 in the pattern. The blades are inserted into corresponding slits located in the flexible pattern according to the design of the tire tread desired. Then, with the blades firmly held in the pattern, a plaster slurry is poured over the pattern and let harden. After the resulting plaster mold has hardened with the blade portions 14 embedded thereto, it is removed and used in casting a metal tire mold, with the Sipe inserts integrally embedded. A single complete plaster "positive" mold is required for each metal mold.

Because of the improved life and strength of flexible pattern 18 resulting from the new blade design, the pattern can be used many more times than with the blades heretofore used.

Figure 3:
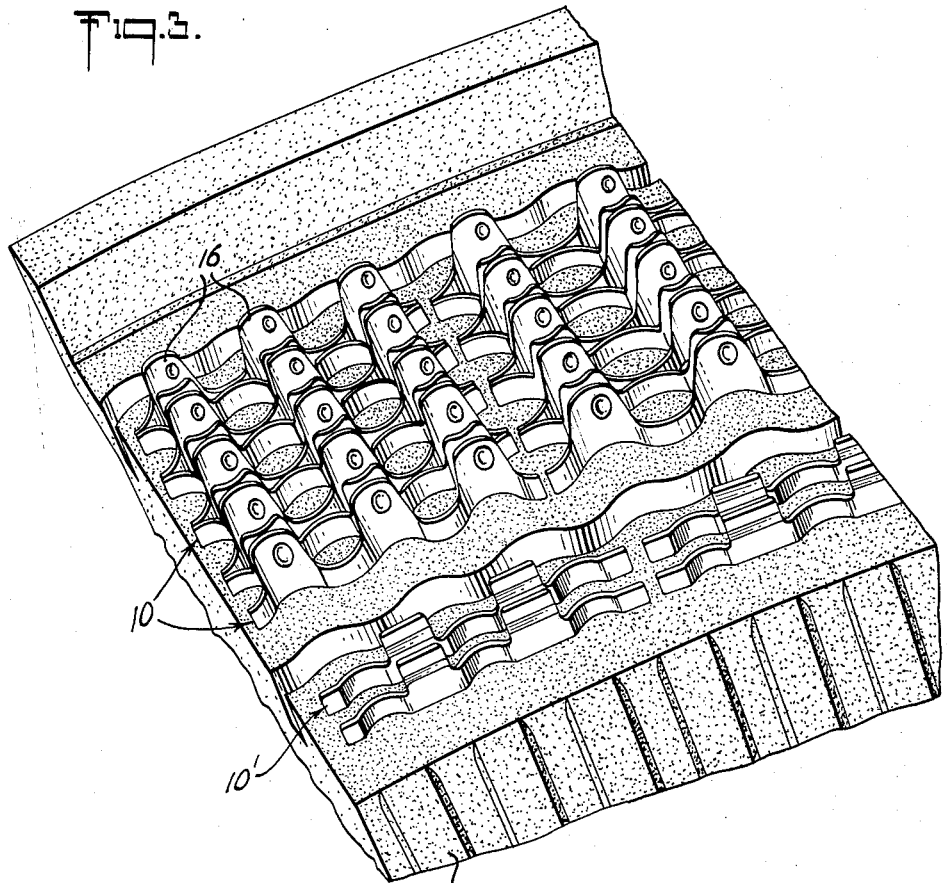

A portion of a plaster "positive" mold 30 is shown in Figure 3 with the Sipe blades closely positioned to make a typical non-skid tire tread. This figure also illustrates another advantage of the invention: The head portions 14 of the inverted Sipe blades 10 are embedded in the plaster mold 30 and the feet 16 project upward. Because of the cut-away areas between feet 16, it is easier to inspect the blades for imperfections and for plaster "flash," i.e., an unwanted plaster coating on the blades 14 and also to clean off plaster from the blades. When a molten metal is poured around the blade feet 16 in the plaster mold 30, the metal because of the open spaces between the feet, will more easily fill in and conform to the tread pattern. Along with the particular blades 10 previously shown in Figure 1, Figure 3 shows feet of different form on blades 10' made according to the invention.

Although the invention is described above in connection with the making of plaster molds for casting aluminum, it is also applicable for the making of molds of other materials and by other processes and for other articles, where it is desired to have sheet metal inserts in the final castings. Thus, with the process for making cast iron molds for tire making described in the Patent No. 2,836,867 and 2,872,715, a wasteable plaster pattern is made on a flexible elastomeric model and the Sipes may be pushed or driven into the soft plaster pattern. The present invention facilitates this and reduces risk of crushing the plaster. Thus inserting Sipes into the plaster pattern reduces the time required of each model in process of molding a plaster pattern and correspondingly reduces the overhead cost. Or the Sipes may be set in preformed slits in the flexible model and transferred first to the plaster pattern and then to the bonded-sand casting mold and finally to the iron casting.

The above description of the invention is intended as illustration and to so instruct others skilled in this art that they will be enabled to modify and select alternatives best suited to each particular use. Various changes and modifications from the embodiments of the invention specfically described will occur to those skilled in the art and can be made without departing from the spirit or scope of the invention as set forth.

I claim:

1. A pattern for making a metal-casting mold, which comprises a body of flexible resilient material having a face corresponding to the face of the casting desired and having slits located at positions to be occupied by blade inserts to be embedded in said casting, blades having head portions adapted to serve as desired projections on said casting and spaced feet having cut-away portions therebetween and projecting into said slits and engaged by the pattern material at the sides of the slits, whereby the usable life of said flexible material is extended.

2. A pattern as defined in claim 1 in which the said slits are connected by very shallow slits in which the edges of the blades between said feet are also engaged.

3. A method of manufacturing mold bodies having thin blades projecting therefrom for subsequent incorporation into metal castings, said method comprising providing a multitude of said blades with areas cut out from one side leaving substantial feet spaced by said cut out areas and adapted to project into a pattern, providing a pattern with slits corresponding to said feet having the feet mounted therein and relatively shallow slits extending beyond the slits for the feet and having therein the edge of the cut-out portions of the blades, pouring over said pattern and around the exposed portions of said blades a settable mold material, setting said material on the pattern to form a mold body, and removing the resulting body with the blades embedded therein and with their feet projecting therefrom, whereby the usable life of the pattern is extended.

4. The method as in claim 3 in further combination with the step of pouring casting metal over the mold body with its projecting blades, whereby the cut-out portions of the blades permit the casting metal to flow evenly around and embed their projecting feet.

5. A method of manufacturing plaster mold bodies having thin blades projecting from them for subsequent incorporation in metal castings, said method comprising providing a flexible elastomeric pattern on which the plaster bodies are made, and having slits slightly narrower than projecting feet on said blades, located to receive said feet, providing a multitude of said blades with areas cut out from one side leaving substantial feet, spaced by said cut out areas, adapted to project into said pattern, inserting said feet into said slits whereby to hold the blades correctly positioned on the pattern, casting plaster over the pattern and blades, removing the plaster body with the blades therein, and repeating said process using said pattern and another set of blades.

References Cited in the file of this patent

UNITED STATES PATENTS

| | | |
|---|---|---|
| 381,156 | McCormick | Apr. 17, 1888 |
| 2,263,001 | Gunsaulus et al. | Nov. 18, 1941 |
| 2,743,495 | Eklund | May 1, 1956 |
| 2,896,281 | Miller et al. | July 28, 1959 |